United States Patent
Inaba et al.

(10) Patent No.: US 9,156,347 B2
(45) Date of Patent: Oct. 13, 2015

(54) MOUNTING STRUCTURE OF BUFFER MEMBER FOR FUEL TANK

(75) Inventors: Ryutaro Inaba, Sakura (JP); Mitsuhiro Seko, Sakura (JP)

(73) Assignee: Yachiyo Industry Co., Ltd., Sayama-shi (JP)

( * ) Notice: Subject to any disclaimer, the term of this patent is extended or adjusted under 35 U.S.C. 154(b) by 761 days.

(21) Appl. No.: 13/407,981

(22) Filed: Feb. 29, 2012

(65) Prior Publication Data

US 2012/0224914 A1    Sep. 6, 2012

(30) Foreign Application Priority Data

Mar. 1, 2011 (JP) .................................. 2011-043575

(51) Int. Cl.
*B60K 15/067* (2006.01)
*F16F 1/376* (2006.01)
*B60K 15/03* (2006.01)

(52) U.S. Cl.
CPC ............... *B60K 15/067* (2013.01); *F16F 1/376* (2013.01); *B60K 2015/03032* (2013.01); *B60K 2015/03039* (2013.01); *B60K 2015/03046* (2013.01); *B60K 2015/03052* (2013.01); *B60K 2015/03059* (2013.01); *B60K 2015/03065* (2013.01); *F16F 2230/0005* (2013.01); *Y10T 403/45* (2015.01)

(58) Field of Classification Search
CPC ........... B60K 2015/03032; B60K 2015/03039; B60K 2015/03046; B60K 2015/03052; B60K 2015/03059; B60K 2015/03065; B60K 15/067
USPC ........... 280/834; 403/224, 227, 228; 267/139, 267/140; 220/562; 137/354
See application file for complete search history.

(56) References Cited

U.S. PATENT DOCUMENTS

| 1,611,906 | A | * | 12/1926 | Gurney ......................... 280/834 |
| 3,652,074 | A | * | 3/1972 | Frederickson et al. ....... 267/137 |
| 4,014,588 | A | * | 3/1977 | Kohriyama ................... 296/35.1 |
| 6,435,489 | B1 | * | 8/2002 | Rice et al. ................... 267/140.5 |
| 7,045,708 | B2 | * | 5/2006 | Miura et al. ................... 174/507 |
| 7,497,290 | B2 | * | 3/2009 | Marsala et al. .............. 180/69.1 |
| 2011/0127761 | A1 | * | 6/2011 | Yoshizawa et al. ........... 280/834 |

FOREIGN PATENT DOCUMENTS

| EP | 2033829 A1 | 3/2009 |  |
| JP | 57-201721 | 12/1982 |  |
| JP | 58-49521 | 3/1983 |  |
| JP | 5-89060 | 12/1993 |  |
| JP | 2003-214470 | 7/2003 |  |
| WO | WO 2010016204 A1 * | 2/2010 | ............. B60K 15/03 |

* cited by examiner

Primary Examiner — Kevin Murphy
(74) Attorney, Agent, or Firm — Rankin, Hill & Clark LLP

(57) ABSTRACT

A mounting structure wherein a buffer member has a body portion, and a leg portion which is extended from the body portion and engaged with a recess, wherein the body portion has a plurality of first convex portions which are arranged around a center axis of the body portion at regular intervals and abut against a vehicle body, a plurality of first concave portions each of which is formed between the adjacent first convex portions, a plurality of second convex portions which are arranged around the center axis of the body portion 61 at regular intervals and abut the fuel tank, and a plurality of second concave portions each of which is formed between the adjacent second convex portions, and wherein the first convex portion is formed corresponding to the second concave portion, and the second convex portion is formed corresponding to the first concave portion, is provided.

6 Claims, 8 Drawing Sheets

MOUNTING STRUCTURE OF BUFFER MEMBER FOR FUEL TANK

CROSS REFERENCE TO RELATED APPLICATION

The present application claims benefit of the filing date of Japanese Patent Application No. 2011-043575 filed on Mar. 1, 2011 which is incorporated herein by reference.

BACKGROUND OF THE INVENTION

1. Field of the Invention

The present invention relates to a mounting structure of a buffer member installed between a fuel tank for a vehicle and a vehicle body.

2. Description of the Related Art

Conventionally, a technique for installing a buffer member such as a rubber, etc. between a fuel tank for a vehicle and a floor panel of a vehicle body has been well known. By installing the buffer member between the fuel tank and the floor panel, the fuel tank is prevented from striking against the floor panel, and vibration and noise caused by ruffles of fuel in the fuel tank, etc. is prevented from being transmitted to the vehicle body. For example, JP 05-089060 Y discloses that an adhesive layer is provided between a fuel tank and a floor panel when a buffer member is installed. Also, JP 05-089060 Y discloses that a double-faced tape may be used instead of the adhesive.

However, in adhesion by the adhesive or the double-faced tape, there arises a problem that a plasticizer contained in the buffer member is drawn to an adhesive interface as time passes and an adhesive strength is lowered. Also, since the adhesive strength of the buffer member depends on a strength of pressure to press the buffer member, a stable adhesive strength can not be obtained. Also, since the buffer member can not be removed easily once it is adhered, high accuracy is required at the time of assembling. For this reason, there arises a problem that a large burden is imposed on a worker. Also, since a buffer member of the prior art shows an approximately tabular appearance, it has a poor cushion feature.

The present invention aims to solve the above problems. Therefore, an object of the present invention is to provide a mounting structure of a buffer member for a fuel tank, which mounting structure provides good cushion feature, prevents degradation in a connection strength caused by age degradation, and has improved mounting characteristics.

SUMMARY OF THE INVENTION

In order to achieve the above object, the present invention provides a mounting structure, comprising: a fuel tank whose surface has a recess; and a buffer member installed between a vehicle body and the fuel tank, wherein the buffer member comprises: a body portion; and a leg portion which is extended from the body portion and engaged with the recess, wherein the body portion comprises: a plurality of first convex portions which are arranged around a center axis of the body portion at regular intervals and project toward the vehicle body; a plurality of first concave portions formed among the adjacent first convex portions; a plurality of second convex portions which are arranged around a center axis of the body portion at regular intervals and project toward the fuel tank; a plurality of second concave portions formed among the adjacent second convex portions, wherein the first convex portion is formed at a position so as to correspond to the second concave portion and the second convex portion is formed at another position so as to correspond to the second concave portion in a direction which is parallel to the center axis of the body portion.

According to the above structure, since the first convex portion is pushed into the second concave portion and the second convex portion is pushed into the first concave portion when an external force is applied to the buffer member, the cushion feature can be improved. Also, since the leg portion is engaged with the recess, degradation of adhesive, etc. does not affect a connection strength and degradation in a connection strength caused by age degradation can be prevented. Also, the buffer member can be mounted to the fuel tank easily and stably by only pushing the leg portion of the buffer member into the recess.

Also, the present invention provides a mounting structure, comprising: a fuel tank whose surface has a recess; a buffer member installed between a vehicle body and the fuel tank; and a clip for connecting the fuel tank to the buffer member, wherein the buffer member comprises: a hole formed at a bottom thereof; a plurality of first convex portions which are arranged around a center axis of the buffer member at regular intervals and project toward the vehicle body; a plurality of first concave portions which are formed among the adjacent first convex portions; a plurality of second convex portions which are arranged around the center axis of the buffer member at regular intervals and project toward the clip; a plurality of second concave portions which are formed among the adjacent second convex portions, wherein the first convex portion is formed at a position so as to correspond to the second concave portion and the second convex portion is formed at another position so as to correspond to the second concave portion in a direction which is parallel to the center axis of the buffer member, the clip comprises: a substrate portion which abuts against the second convex portion; a leg portion which is formed on the substrate portion and engaged with the recess; and a head portion which is formed on the substrate portion at the opposite side to the leg portion and engaged with the hole, wherein a removal proof edge which projects outwardly is formed on a outer surface of the head portion.

According to the above structure, since the first convex portion is pushed into the second concave portion and the second convex portion is pushed into the first concave portion when an external force is applied to the buffer member, the cushion feature can be improved. Also, since the buffer member is mounted to the fuel tank via the clip, degradation of adhesive, etc. does not affect a connection strength and degradation in a connection strength caused by age degradation can be prevented. Also, since the removal proof edge is formed on the head portion of the clip, a connection strength between the clip and the buffer member can be improved. Also, the buffer member can be mounted to the fuel tank easily and stably by only pushing the buffer member and the clip into the recess of the fuel tank.

Also, a projection portion which projects toward a center of an opening of the recess is preferably formed in the recess. According to the above structure, a connection strength between the projection portion and the leg portion can be improved.

Also, the removal proof edge preferably comprises: an inclined surface which inclines toward the substrate portion as it becomes apart from a center axis of the head portion; and a barb surface which is extended from the outer surface of the head portion to a tip of the inclined surface and serves as a barb. According to the above structure, the buffer member can be engaged with the clip easily, and the buffer member can hardly be removed from the clip by virtue of the barb surface once the engagement is established.

Also, a salient which projects toward a center of an opening of the hole is preferably formed in the hole. According to the above structure, a connection strength between the hole and the head portion of the clip can be improved.

DESCRIPTION OF PREFERRED EMBODIMENTS

First Embodiment

Figure 1:
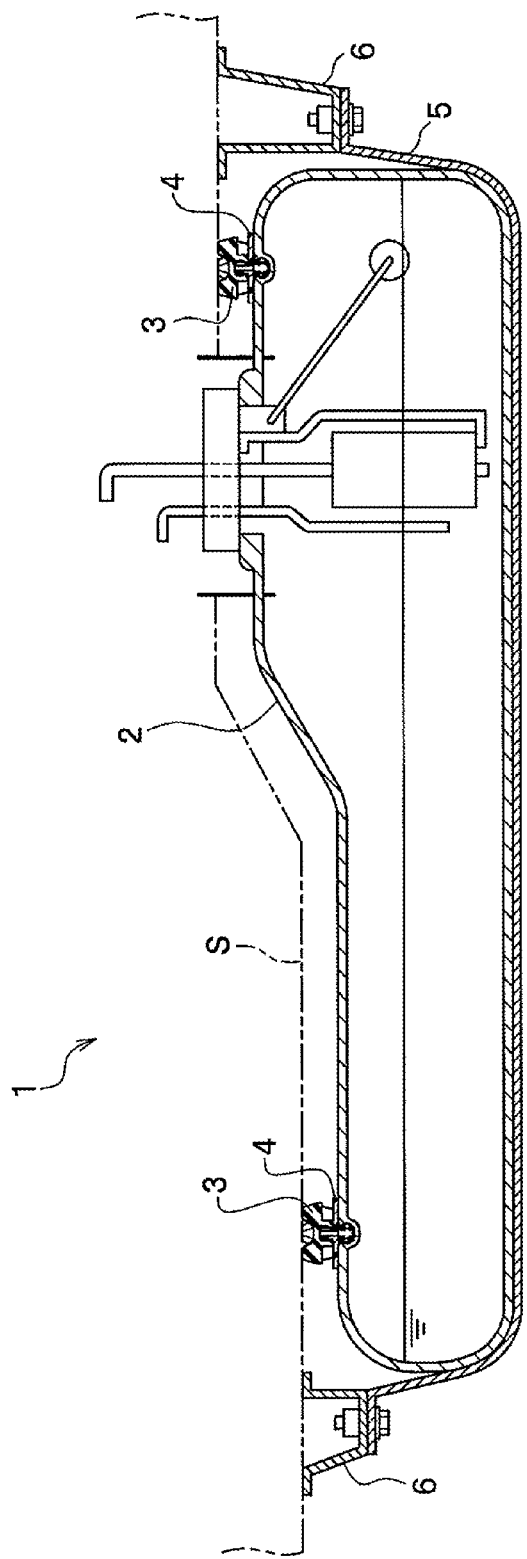
FIG. 1 is a full sectional side view of an amounting structure according to a first embodiment.

With reference to drawings, a first embodiment of the present invention will be explained in detail. As shown in FIG. 1, a mounting structure 1 according to this embodiment relates to a mounting structure of a buffer member 3 installed between a fuel tank 2 and a vehicle body S of a vehicle. The mounting structure 1 mainly comprises: the fuel tank 2; the buffer member 3; and a clip 4.

The fuel tank 2 is a hollow container made of resin or metal for storing fuel, and is fixed to a bottom (a floor panel) of the vehicle body S. In this embodiment, a bottom of the fuel tank 2 is supported by a U-shaped tank band 5, and both ends of the tank band 5 is fixed to the vehicle body S via brackets 6, 6.

Figure 2:
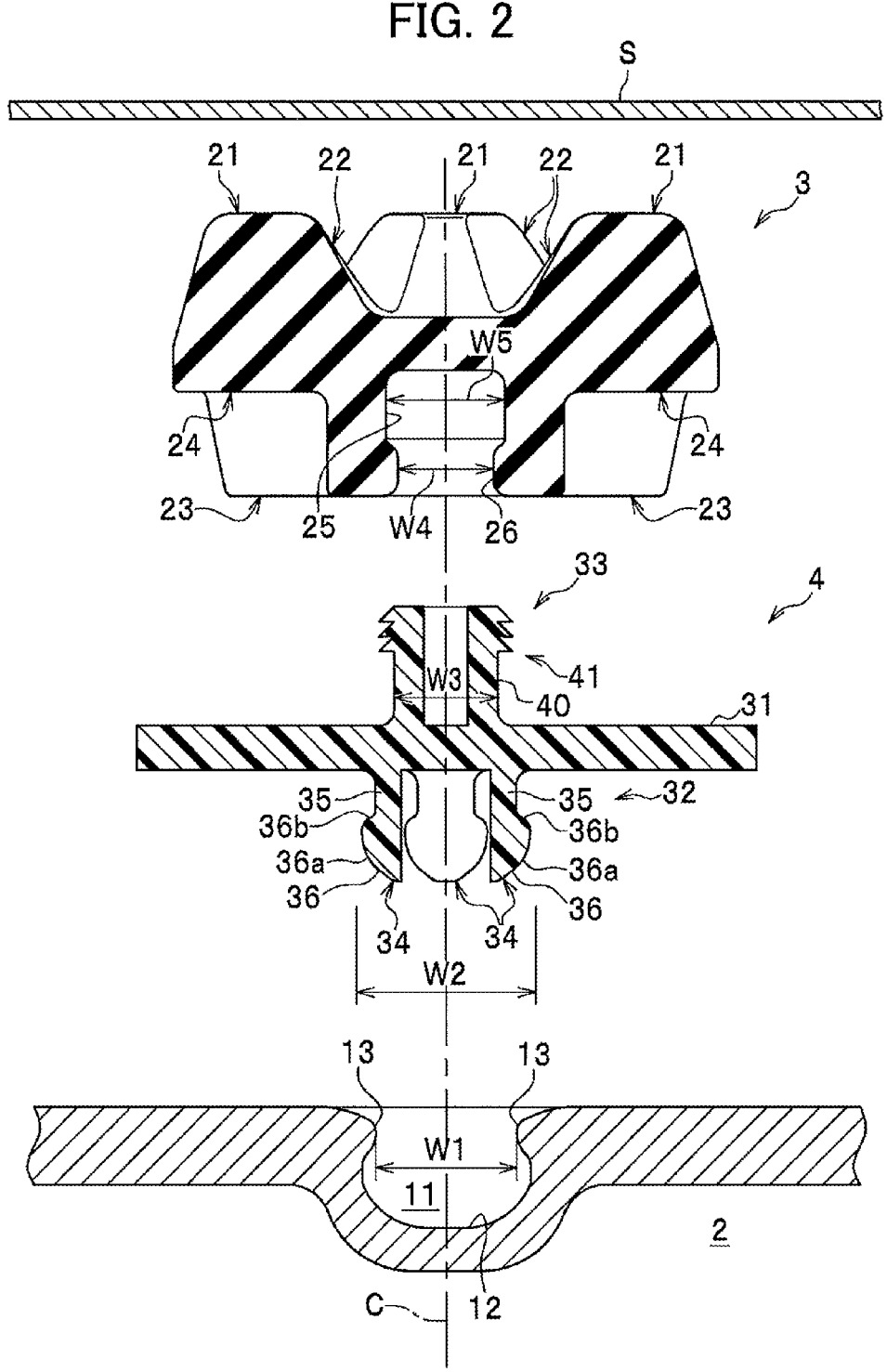
FIG. 2 is an exploded sectional side view of the mounting structure according to the first embodiment.
Figure 4:
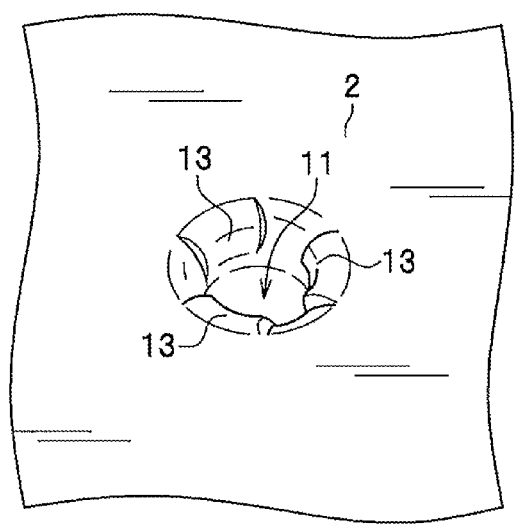
FIG. 4 is a perspective view of a recess of a fuel tank according to the first embodiment.

As shown in FIGS. 2 and 4, a recess 11 is formed on a surface of the fuel tank 2. A leg portion 32 of the clip 4 is engaged with the recess 11. In this embodiment, the recess 11 is formed on the surface opposite to the vehicle body S of the fuel tank 2. The recess 11 has a roundly hollowed bottom 12, and a projection portion 13 which projects toward a center of an opening. The number of the projection portion 13 is not limited, but three projection portions 13 are formed at regular intervals in this embodiment.

Figure 3:
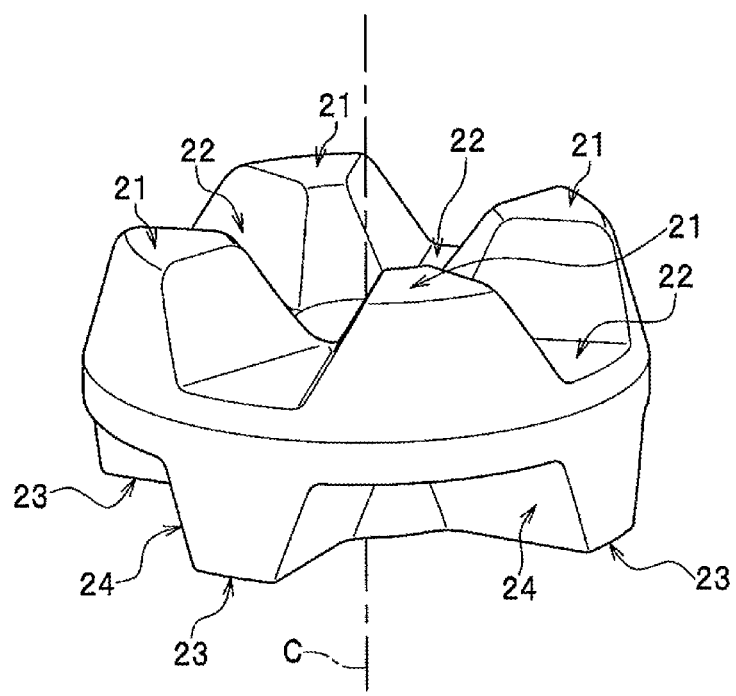
FIG. 3 is a perspective view of a buffer member according to the first embodiment.

As shown in FIGS. 2 and 3, the buffer member 3 is installed between the fuel tank 2 and the vehicle body S. The material of the buffer member 3 is not limited, but the buffer member 3 is made of a rubber in this embodiment. The buffer member 3 prevents a collision of the fuel tank 2 with the vehicle body S, and prevents vibration and noise caused by ruffles of fuel in the fuel tank, etc. from being transmitted to the vehicle body.

The buffer member 3 is configured to be round in a plan view, and has a first convex portion 21, a first concave portion 22, a second convex portion 23, and a second concave portion 24.

The first convex portion 21 is a portion which projects toward the vehicle body S. Four first convex portions 21 are formed around a center axis C at regular intervals. Each of the first convex portions 21 has the same configuration. The first convex portion 21 abuts against the vehicle body S, is configured to be approximately trapezoid in a sectional view, and gradually narrows toward a top (i.e., toward the vehicle body S). Four first convex portions 21 are formed in this embodiment, but any number of the first convex portions 21 may be formed as far as the number is equal to or greater than two. Also, the configuration of the first convex portion 21 is not limited.

The first concave portion 22 is a portion which is formed between the adjacent first convex portions 21. The first concave portions 22 are formed around the center axis C at regular intervals. Each of the first concave portions 22 has the same configuration. Four first concave portions 22 are formed corresponding to the first convex portions 21.

The second convex portion 23 is a portion which projects toward the clip 4. Four second convex portions 23 are formed around the center axis C at regular intervals. Each of the second convex portions 23 has the same configuration. The second convex portion 23 abuts against the clip 4, is configured to be approximately trapezoid in a sectional view, and gradually narrows toward a top (i.e., toward the clip 4). Four second convex portions 23 are formed in this embodiment, but any number of the second convex portions 23 may be formed as far as the number is equal to or greater than two. Also, the configuration of the second convex portion 23 is not limited.

The second concave portion 24 is a portion which is formed between the adjacent second convex portions 23. The second concave portions 24 are formed around the center axis C at regular intervals. Each of the second concave portions 24 has the same configuration. Four second concave portions 24 are formed corresponding to the second convex portions 23.

As shown in FIG. 3, in a direction parallel to the center axis C (i.e., in the vertical direction in FIG. 3), the first convex portion 21 is formed corresponding to the second concave portion 24. Also, the second convex portion 23 is formed corresponding to the first concave portion 22.

As shown in FIG. 2, a hole 25 is formed at a center of the bottom of the buffer member 3. A head portion 33 (described later) of the clip 4 is inserted into the hole 25. The configuration of the hole 25 is made to be columnar to conform to that of the head portion 33. A salient 26 which projects toward a center of an opening of the hole 25 is provided. The salient 26 is formed along the circumference of the opening of the hole 25. In addition, the salient 26 may be provided if necessary.

As shown in FIG. 2, the clip 4 is a resinous member for connecting the buffer member 3 to the fuel tank 2. The clip 4 mainly comprises: a substrate portion 31; the leg portion 32; and the head portion 33.

The substrate portion 31 is configured to be a disk shape, and has a diameter which is larger than that of the buffer member 3. The configuration of the substrate portion 31 may be a polygonal disk. One side of the substrate portion 31 (a top surface of the substrate portion 31 in FIG. 2) abuts against the second convex portion 23. The leg portion 32 is extended from the substrate portion 31 toward the fuel tank 2, and is engaged with the recess 11. In this embodiment, the leg portion 32 comprises four engagement pieces 34 (three engagement pieces 34 are drawn in FIG. 2). Each of the four engagement pieces 34 has the same configuration, and formed around the center axis C at regular intervals. Since the four engagement pieces 34 have free ends, ends thereof can be elastically deformed in a horizontal direction.

The engagement piece 34 has a base end portion 35 which is extended from the substrate portion 31, and an elastic engagement portion 36 which is formed at an end of the base end portion 35. The elastic engagement portion 36 has a tapered portion 36a which is inclined upward (i.e., toward the substrate portion 31) as the tapered portion 36a becomes apart from the center axis C, and a horizontal portion 36b which is extended outwardly from the base end portion 35.

The head portion 33 is provided upright at a center of the substrate portion 31 on the opposite side to the leg portion 32. The head portion 33 is inserted into the hole 25 of the buffer member 3. The head portion 33 is configured to be cylindrical, and a removal proof edge 41 is formed on a outer surface 40. Three removal proof edges 41 are formed at an upper end of the head portion 33.

Figure 5:
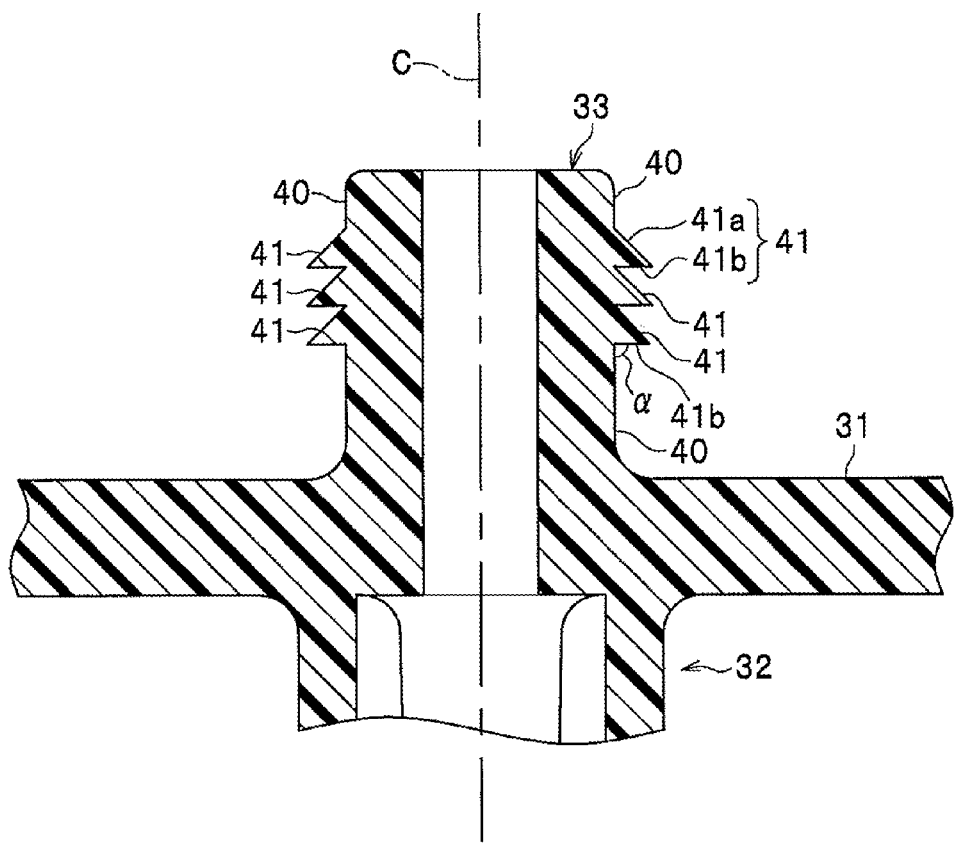
FIG. 5 is an enlarged sectional side view of a clip according to the first embodiment.

As shown in FIG. 5, the removal proof edge 41 is configured to be triangle in a sectional view, and is formed along the circumference of the head portion 33. The removal proof edge 41 comprises: an inclined surface 41a which is extended from the outer surface 40 of the head portion 33; and a barb surface 41b which is extended from the outer surface 40. The inclined surface 41a is inclined downward (i.e., toward the substrate portion 31) on the outer surface 40 as the inclined surface 41a becomes apart from the center axis C. The barb surface 41b is approximately perpendicular to the outer surface 40, and is extended to a tip of the inclined surface 41a. An angle α between the outer surface 40 and the barb surface 41b is preferably equal to or less than 90 degrees.

Three removal proof edges 41 are formed in this embodiment, but any number of the removal proof edges 41 may be formed. Also, the removal proof edge 41 is configured to be triangle in a sectional view in this embodiment, but the configuration of the removal proof edge 41 is not limited as far as the buffer member 3 can hardly be removed from the head portion 33.

As shown in FIG. 2, a distance W1 between the projection portions 13, 13 of the recess 11 is less than an external diameter W2 (normal condition) of the leg portion 32. Also, an external diameter W3 of the head portion 33 is approximately equal to a distance W4 between the salient 26, 26 of the hole 25. An internal diameter W5 of the hole 25 is slightly greater than the distance W4 between the salient 26, 26.

First, when the buffer member 3 and the clip 4 are mounted to the fuel tank 2, the head portion 33 of the clip 4 is pushed into the hole 25 of the buffer member 3. Next, the leg portion 32 of the clip 4 is pushed into the recess 11 of the fuel tank 2. As a result, the buffer member 3 can be mounted to the fuel tank 2.

Figure 6:
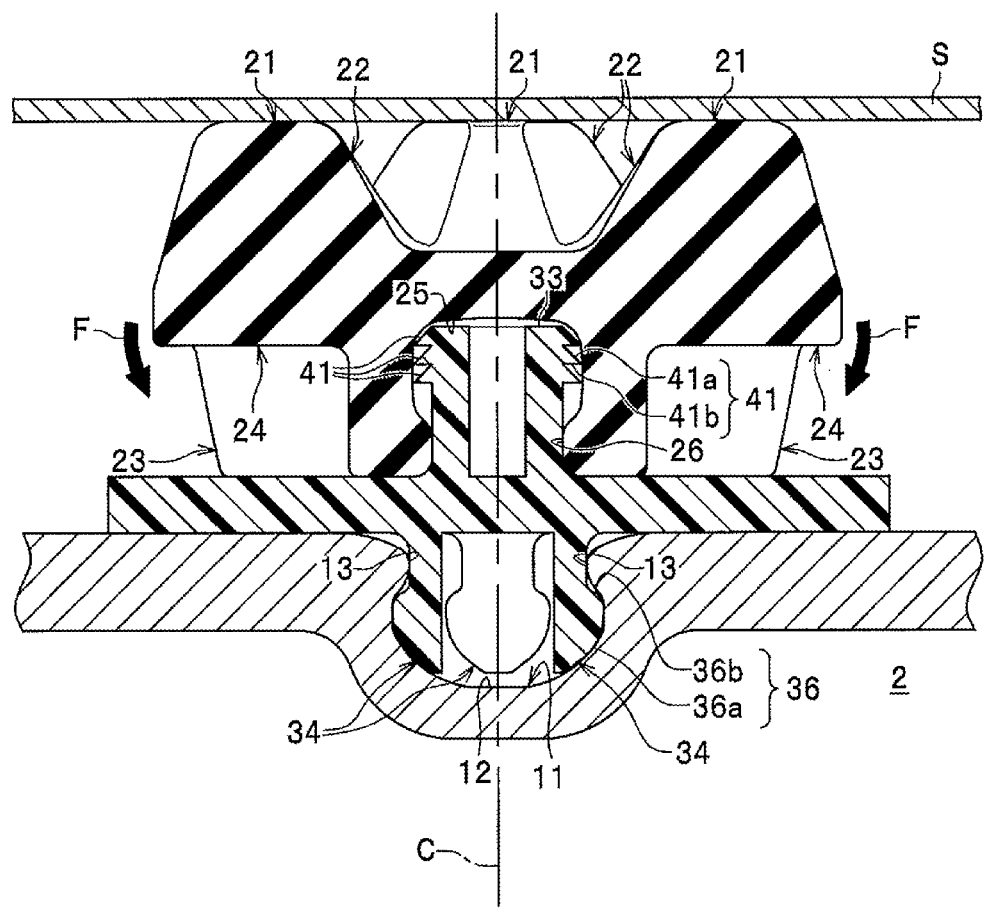
FIG. 6 is a sectional side view the mounting structure according to the first embodiment.

According to the mounting structure 1 of this embodiment, as shown in FIG. 3, the first convex portion 21 is formed so as to correspond to the second concave portion 24 in the vertical direction, and the second convex portion 23 is formed so as to correspond to the first concave portion 22 is the vertical direction. As a result, when an external force having a vertical component is applied to the buffer member, the cushion feature can be improved since the first convex portion 21 is pushed into the second concave portion 24 and the second convex portion 23 is pushed into the first concave portion 22. For example, as shown by an arrow F in FIG. 6, when an external force having a vertical component is applied to the buffer member 3, the first convex portion 21 is bent toward the second concave portion 24. Likewise, the second convex portion 23 is bent toward the first concave portion 22. For this reason, the cushion feature of the buffer member 3 can be improved.

Also, the buffer member 3 is configured to be round in a plan view, and the same number of the first convex portion 21, the first concave portion 22, the second convex portion 23, and the second concave portion 24 are formed on the same circle at regular intervals. Therefore, an anisotropy can be omitted when the external force is applied.

Also, since the buffer member 3 is mounted to the fuel tank via the clip 4, degradation of adhesive, etc. does not affect a connection strength and degradation in a connection strength caused by age degradation can be prevented. Also, the buffer member 3 can be mounted to the fuel tank 2 easily and stably by only pushing the buffer member and the clip 4 into the recess 11 of the fuel tank 2.

Also, since the projection portion 13 which projects toward the center of the opening of the recess 11 is formed in the recess 11, a connection strength between the projection portion 13 and the leg portion 32 of the clip 4 can be improved.

Also, the end (the engagement piece 34) of the leg portion 32 is formed to be elastically deformed, and the elastic engagement portion 36 is formed at the end of the leg portion 32 so as to be engaged with the projection portion 13. For this reason, when the leg portion 32 is inserted into the recess 11, the engagement piece 34 of the leg portion 32 is pushed by the projection portion 13, the external diameter W2 of the leg portion 32 is decreased, and a biasing force is applied from the center to the outward after passing through the projection portion 13. For this reason, the elastic engagement portion 36 of the leg portion 32 is firmly engaged with the projection portion 13 of the recess 11, and the connection strength can be improved.

Also, since the elastic engagement portion 36 has the tapered portion 36a, the elastic engagement portion 36 can be pushed into the recess 11 smoothly. Also, since the elastic engagement portion 36 has the horizontal portion 36b, once the elastic engagement portion 36 is engaged with the projection portion 13 of the recess 11, the elastic engagement portion 36 can hardly be removed from the projection portion 13 even if a force is applied upward. For this reason, the connection strength between the recess 11 and the clip 4 can be improved.

Also, since the head portion 33 is provided with the removal proof edge 41 in this embodiment, the buffer member 3 can be mounted to the clip 4 smoothly by the inclined surface 41a. Once the buffer member 3 is mounted to the clip 4, the buffer member 3 can hardly be removed from the clip 4 by virtue of the barb surface 41b. For this reason, the connection strength between the buffer member 3 and the clip can be improved.

Also, according to this embodiment, the buffer member 3 and the clip 4 can be mounted to the fuel tank 2 again. Also, the buffer member 3 can be removed from the clip 4, they can be reused easily. Also, when the leg portion 32 is engaged with the projection portion 13 of the recess 11 by pushing the buffer member 3 and the clip 4 into the recess 11, sound and vibration are caused by an elastic deformation of the leg portion 32 (i.e., the engagement piece 34). For this reason, a worker can confirm that the clip 4 is surely engaged with the recess 11.

Although the first embodiment of the present invention has been explained, various changes and modifications can be made without departing from the sprit of the present invention. For example, although the leg portion 32 of the clip 4 is divided into four pieces in this embodiment, it may be divided into any other number or may not divided. Also, the number and interval of the removal proof edge 41 may appropriately be determined. The configuration of the buffer member 3 may be other configuration.

Second Embodiment

Figure 7:
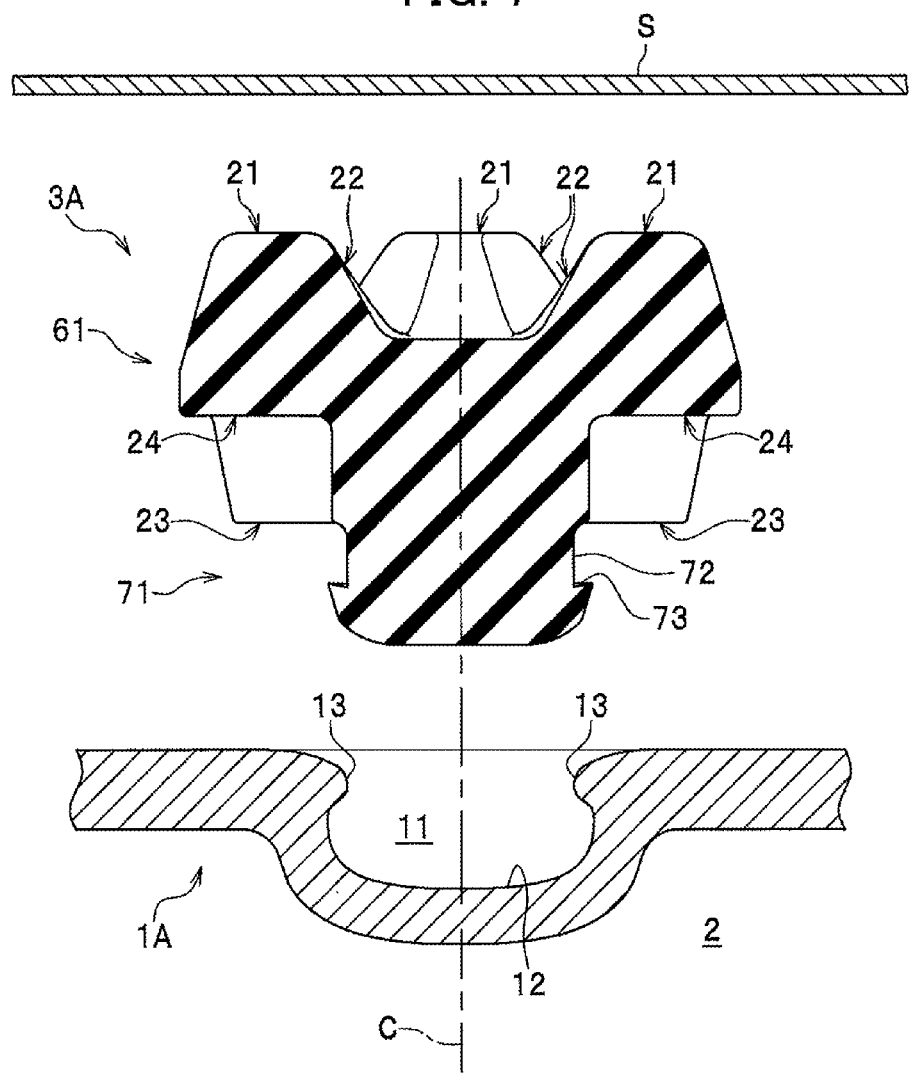
FIG. 7 is an exploded sectional side view of a mounting structure according to a second embodiment.

Next, a second embodiment of the present invention will be explained. As shown in FIG. 7, a mounting structure 1A according to the second embodiment mainly comprises: a fuel tank 2; and a buffer member 3A. The mounting structure 1A according to the second embodiment differs from that according to the first embodiment in that the mounting structure 1A does not comprises a clip. With respect to the fuel tank 2, since it is the same as that of the first embodiment, detailed explanation will be omitted.

As shown in FIG. 7, the buffer member 3A is made of a rubber, and installed between the fuel tank 2 and the vehicle body S. The buffer member 3A has a body portion 61, and a leg portion 71 which is extended from the body portion 61 toward a recess 11. In this embodiment, the buffer member 3A is integrally molded.

Figure 8:
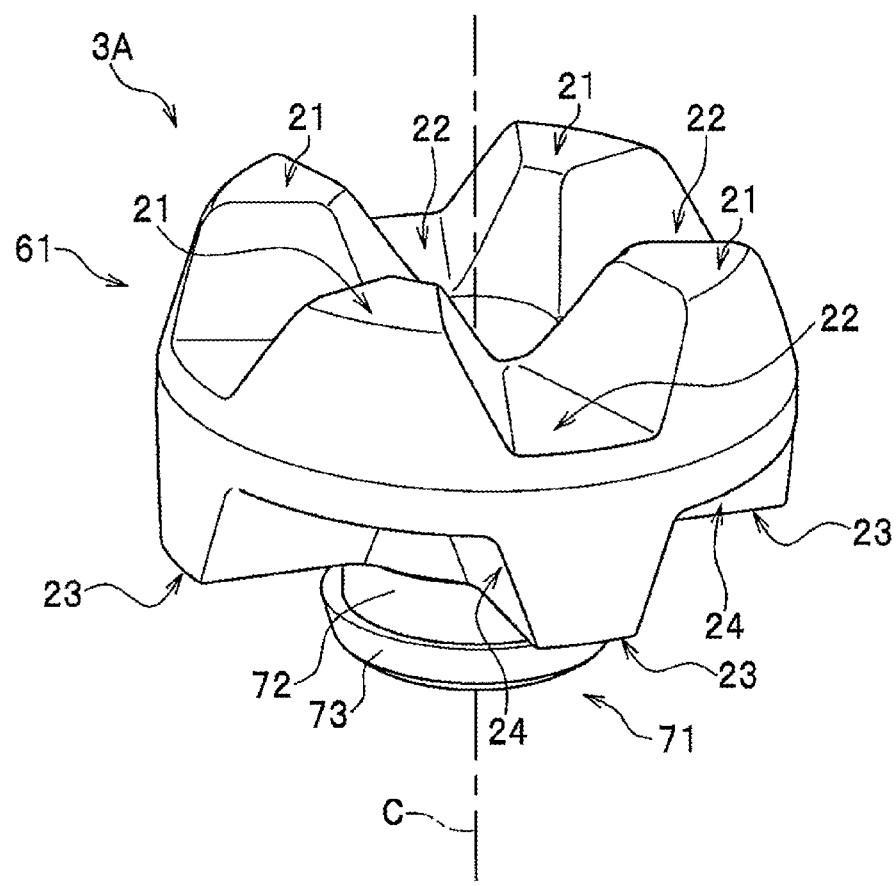
FIG. 8 is a perspective view of a buffer member according to the second embodiment.

As shown in FIGS. 7 and 8, the body portion 61 is configured to be round in a plan view, and has a first convex portion 21, a first concave portion 22, a second convex portion 23, and a second concave portion 24. The body portion 61 has a structure which is similar to that of the buffer member 3 of the first embodiment except that a hole 25 is not formed.

The leg portion 71 projects from a bottom of the body portion 61 toward the recess 11 (i.e., downward in FIG. 8). The leg portion 71 has an axial base portion 72 having a constant external diameter, and an extended diameter portion 73 which is formed at the end of the axial base portion 72. The extended diameter portion 73 has an external diameter which is larger than that of the axial base portion 72, and is engaged with a projection portion 13 of the recess 11. The end of the extended diameter portion 73 is configured to be approximately spherical.

When the buffer member 3A is mounted to the fuel tank 2, the leg portion 71 of the buffer member 3A is pushed into the recess 11 of the fuel tank 2 so that the extended diameter portion 73 of the leg portion 71 is engaged with the projection portion 13 of the recess 11. As a result, the buffer member 3A can be mounted to the fuel tank 2.

Figure 9:
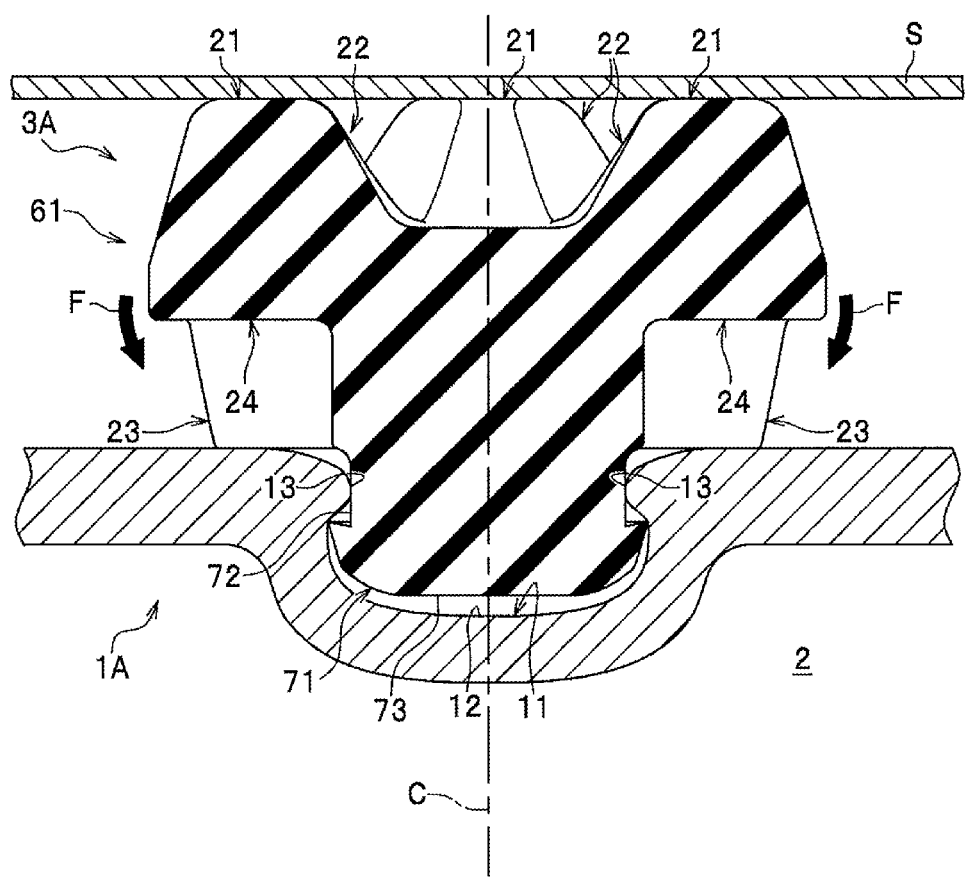
FIG. 9 is a sectional side view of a mounting structure according to the second embodiment.

According to the mounting structure 1A of this embodiment, as shown in FIG. 8, the first convex portion 21 is formed so as to correspond to the second concave portion 24 in the vertical direction, and the second convex portion 23 is formed so as to correspond to the first concave portion 22 in the vertical direction. As a result, when an external force having a vertical component is applied to the buffer member 3A, a cushion feature can be improved since the first convex portion 21 is pushed into the second concave portion 24 and the second convex portion 23 is pushed into the first concave portion 22. For example, as shown by an arrow F in FIG. 9, when an external force having a vertical component is applied to the buffer member 3A, the first convex portion 21 is bent toward the second concave portion 24. Likewise, the second convex portion 23 is bent toward the first concave portion 22. For this reason, the cushion feature of the buffer member 3A can be improved.

Also, since the buffer member 3A is mounted to the fuel tank 2 via the leg portion 71, degradation of adhesive, etc. does not affect a connection strength and degradation in a connection strength caused by age degradation can be prevented. Also, the buffer member 3A can be mounted to the fuel tank 2 easily and stably by only pushing the leg portion 71 of the buffer member 3A into the recess 11 of the fuel tank 2. Also, since the extended diameter portion 73 is engaged with the projection portion 13, once the buffer member 3A is mounted to the fuel tank 2, the buffer member 3A can hardly be removed from the fuel tank 2. Also, since the buffer member 3A is made by integrally molding, the buffer member 3A can be made easily.

Although the second embodiment of the present invention has been explained, various changes and modifications can be made without departing from the sprit of the present invention. For example, although the buffer member 3A is made by integrally molding in this embodiment, the body portion 61 and the leg portion 71 may be molded separately and may be integrated later. Also, although the buffer member 3A (the body portion 61) is configured to be round in a plan view in this embodiment, it may be configured to be polygonal in a plain view.

What is claimed is:

1. A mounting structure, comprising:
a fuel tank whose surface has a recess; and
a buffer member installed between a vehicle body and the fuel tank, wherein
the buffer member is made of rubber, is pressed down from above the recess to be engaged with the recess, and comprises:
a body portion; and
a leg portion which is extended from the body portion and is engaged with the recess, the body portion and the leg portion being integrally molded, wherein
the body portion comprises:
a plurality of first convex portions which are arranged around a center axis of the body portion at regular intervals to project toward the vehicle body and directly abut against the vehicle body;
a plurality of first concave portions formed among the adjacent first convex portions;
a plurality of second convex portions which are arranged around a center axis of the body portion at regular intervals to project toward the fuel tank and directly abut against the fuel tank; and
a plurality of second concave portions formed among the adjacent second convex portions, wherein
the first convex portion is formed at a position so as to correspond to the second concave portion and the second convex portion is formed at another position so as to correspond to the first concave portion in a direction which is parallel to the center axis of the body portion.

2. The mounting structure according to claim 1, wherein a projection portion which projects toward a center of an opening of the recess is formed in the recess.

3. A mounting structure, comprising:
a fuel tank whose surface has a recess;
a buffer member installed between a vehicle body and the fuel tank; and
a clip for connecting the fuel tank to the buffer member, wherein
the buffer member comprises:
a hole formed at a bottom thereof;
a plurality of first convex portions which are arranged around a center axis of the buffer member at regular intervals and project toward the vehicle body;
a plurality of first concave portions which are formed among the adjacent first convex portions;
a plurality of second convex portions which are arranged around the center axis of the buffer member at regular intervals and project toward the clip;
a plurality of second concave portions which are formed among the adjacent second convex portions, wherein
the first convex portion is formed at a position so as to correspond to the second concave portion and the second convex portion is formed at another position so as to correspond to the first concave portion in a direction which is parallel to the center axis of the buffer member, the clip comprises:
- a substrate portion which abuts against the second convex portion;
- a leg portion which is formed on the substrate portion and engaged with the recess; and
- a head portion which is formed on the substrate portion at the opposite side to the leg portion and engaged with the hole, wherein
- a removal proof edge which projects outwardly is formed on an outer surface of the head portion.

4. The mounting structure according to claim 3, wherein a projection portion which projects toward a center of an opening of the recess is formed in the recess.

5. The mounting structure according to claim 3, wherein the removal proof edge comprises:
- an inclined surface which inclines toward the substrate portion as it becomes apart from a center axis of the head portion; and
- a barb surface which is extended from the outer surface of the head portion to a tip of the inclined surface and serves as a barb.

6. The mounting structure according to claim 3, wherein a salient which projects toward a center of an opening of the hole is formed in the hole.

* * * * *